US010820334B2

(12) United States Patent
Östberg et al.

(10) Patent No.: US 10,820,334 B2
(45) Date of Patent: *Oct. 27, 2020

(54) CONFIGURATION OF RESOLUTION OF UPLINK DATA

(71) Applicant: TELEFONAKTIEBOLAGET LM ERICSSON (PUBL), Stockholm (SE)

(72) Inventors: Christer Östberg, Staffanstorp (SE); Henrik Ronkainen, Södra Sandby (SE); Jan Roxbergh, Sollentuna (SE); Henrik Olson, Spånga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,659

(22) Filed: Sep. 9, 2019

(65) Prior Publication Data

US 2020/0022154 A1    Jan. 16, 2020

Related U.S. Application Data

(63) Continuation of application No. 15/523,784, filed as application No. PCT/SE2017/050218 on Mar. 8, 2017, now Pat. No. 10,420,122.

(30) Foreign Application Priority Data

Oct. 25, 2016  (WO) ............... PCT/SE2016/051035

(51) Int. Cl.
*H04W 72/12* (2009.01)
*H04B 7/06* (2006.01)
(Continued)

(52) U.S. Cl.
CPC .......... *H04W 72/12* (2013.01); *H04B 7/0617* (2013.01); *H04B 7/0639* (2013.01);
(Continued)

(58) Field of Classification Search
CPC .. H04B 7/0617; H04B 7/0639; H04B 10/032; H04B 17/14; H04B 17/21; H04L 5/003;
(Continued)

(56) References Cited

U.S. PATENT DOCUMENTS

| 8,644,368 B1 | 2/2014 | Zhang et al. |
| 8,923,386 B2 | 12/2014 | Samardzija et al. |

(Continued)

FOREIGN PATENT DOCUMENTS

| EP | 0843494 A1 | 5/1998 |
| EP | 1827035 A1 | 8/2007 |

(Continued)

OTHER PUBLICATIONS

China Mobile Research Institute, "C-RAN: The road towards green RAN," China Mobile White Paper, v2, 2011.

(Continued)

*Primary Examiner* — Michael Thier
*Assistant Examiner* — Prince A Mensah

(57) ABSTRACT

There are provided mechanisms for configuring resolution of uplink data. An exemplary radio equipment controller (REC) of an access node includes an interface (RCE-RE interface) to a radio equipment (RE) and processing circuitry. The processing circuitry is configured to cause the REC to provide instructions to the RE regarding a resolution in time and/or frequency domain with which beam direction reports are to be transmitted to the REC on the REC-RE interface. The beam direction reports are based on uplink appointed reference symbols for sounding received by the RE on a radio interface and is to be transmitted from the RE to the REC. The REC may thus configure the resolution of the beam direction reports that are received by the REC.

20 Claims, 7 Drawing Sheets

(51) Int. Cl.
| | | |
|---|---|---|
| H04W 88/08 | (2009.01) | |
| H04W 16/28 | (2009.01) | |
| H04W 72/04 | (2009.01) | |
| H04L 5/00 | (2006.01) | |
| H04W 28/00 | (2009.01) | |
| H04W 28/12 | (2009.01) | |
| H04L 27/26 | (2006.01) | |

(52) U.S. Cl.
CPC ............ *H04L 5/003* (2013.01); *H04L 5/0044* (2013.01); *H04L 5/0048* (2013.01); *H04L 5/0053* (2013.01); *H04L 5/0057* (2013.01); *H04L 27/2601* (2013.01); *H04W 16/28* (2013.01); *H04W 28/00* (2013.01); *H04W 28/12* (2013.01); *H04W 72/042* (2013.01); *H04W 72/046* (2013.01); *H04W 72/1268* (2013.01); *H04W 72/1289* (2013.01); *H04W 88/085* (2013.01); *H04L 27/26* (2013.01)

(58) Field of Classification Search
CPC ... H04L 5/0044; H04L 5/0048; H04L 5/0053; H04L 5/0057; H04L 27/2601; H04L 27/26; H04W 16/28; H04W 28/00; H04W 28/12; H04W 28/16; H04W 56/001; H04W 72/12; H04W 72/042; H04W 72/046; H04W 72/1268; H04W 72/1289; H04W 88/08; H04W 88/085
See application file for complete search history.

(56) References Cited

U.S. PATENT DOCUMENTS

| | | | |
|---|---|---|---|
| 2007/0072646 | A1 | 3/2007 | Kuwahara et al. |
| 2010/0074121 | A1 | 3/2010 | Sakama |
| 2010/0075678 | A1 | 3/2010 | Akman et al. |
| 2010/0136932 | A1 | 6/2010 | Österling et al. |
| 2010/0273498 | A1 | 10/2010 | Kim et al. |
| 2011/0032910 | A1 | 2/2011 | Aarflot et al. |
| 2012/0057548 | A1 | 3/2012 | Hasegawa |
| 2012/0300710 | A1 | 11/2012 | Li et al. |
| 2013/0157660 | A1 | 6/2013 | Awad et al. |
| 2013/0294419 | A1* | 11/2013 | Heiser .................. H04W 28/16 370/336 |
| 2014/0119312 | A1 | 5/2014 | Doetsch et al. |
| 2015/0029965 | A1 | 1/2015 | Aminaka et al. |
| 2015/0030094 | A1 | 1/2015 | Zhang |
| 2015/0303950 | A1 | 10/2015 | Shattil |
| 2018/0212653 | A1* | 7/2018 | Miao .................. H04L 5/0044 |
| 2018/0317238 | A1 | 11/2018 | Roxbergh et al. |

FOREIGN PATENT DOCUMENTS

| | | |
|---|---|---|
| EP | 2515590 A1 | 10/2012 |
| EP | 2515603 A2 | 10/2012 |
| EP | 2685755 A1 | 1/2014 |
| EP | 2739105 A1 | 6/2014 |
| EP | 2785099 A1 | 10/2014 |
| EP | 2911331 A1 | 8/2015 |
| TW | 201304448 A1 | 1/2013 |
| WO | 2014076004 A1 | 5/2014 |
| WO | 2015/197102 A1 | 12/2015 |
| WO | 2015/197104 A1 | 12/2015 |
| WO | 2016/039839 A1 | 3/2016 |
| WO | 2016195555 A1 | 12/2016 |
| WO | 2016195556 A1 | 12/2016 |
| WO | 2018093301 A1 | 5/2018 |

OTHER PUBLICATIONS

Samardzija et al., "Compressed transport of baseband signals in radio access networks," IEEE Transactions on Wireless Communications, vol. 11, No. 9, pp. 3216-3225, 2012.
Park et al., "Robust and efficient distributed compression for cloud radio access networks," Vehicular Technology, IEEE Transactions on, vol. 62, No. 2, pp. 692-703, 2013.
Nieman et al., "Time-Domain Compression of Complex-Baseband LTE Signals for Cloud Radio Access Networks," GlobalSIP 2013.
Maiden, "Low-loss compression of CPRI baseband data," EDN Network paper, Sep. 17, 2014.
Common Public Radio Interface (CPRI); Interface Specification. CPRI Specification V7.0, Oct. 9, 2015.
CPRI Specification V6.1 Common Public Radio Interface (CPRI); Interface Specification, Jul. 1, 2014.
Zte et al., High level views on beam management for NR-MIMO, 3GPP TSG RAN WG 1 Meeting #88, R1-1701797, Athens, Greece, Feb. 13-17, 2017.
De La Oliva, et al. An Overview of the CPRI Specification and Its Application to C-RAN-Based LTE Scenarios, IEEE Communications Magazine, vol. 54, No. 2, pp. 152-159, Feb. 2016.
Lorca et al., "Lossless Compression Technique for the Fronthaul of LTS/LTE-Advanced Cloud-RAN Architectures", 2013 IEEE 14th International Symposium on a World of Wireless, Mobile and Multimedia Networks(WOWMOM), IEEE, pp. 1-9, Jun. 4, 2013.
Park et al., "Large-scale Antenna Operation in Heterogeneous Cloud Radio Access Networks: A Partial Centralization Approach", IEEE Wireless Communications; vol. 22, No. 3, Jun. 1, 2015, pp. 1-9.
Sayeed et al., "Beamspace MIMO for High-Dimensional Multiuser Communication at Millimeter-Wave Frequencies", 2013 IEEE Global Communications Conference (Globecom), Dec. 9, 2013, pp. 3679-3684.

* cited by examiner

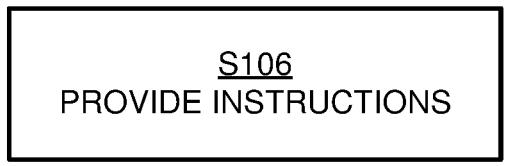
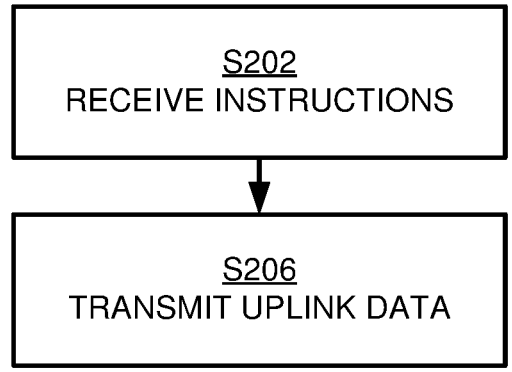
Fig. 2
Fig. 4
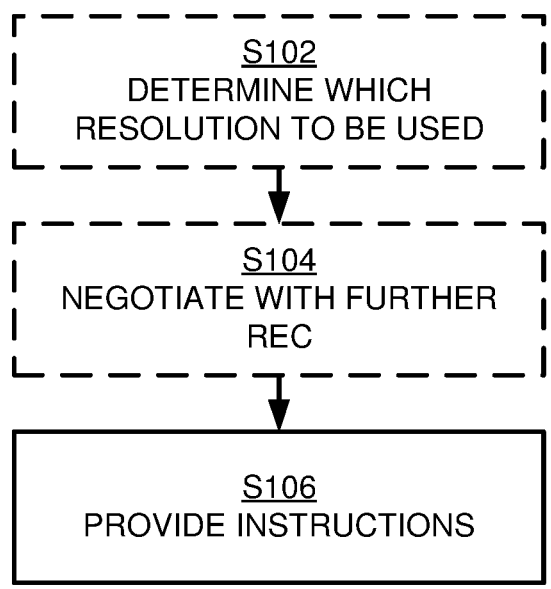
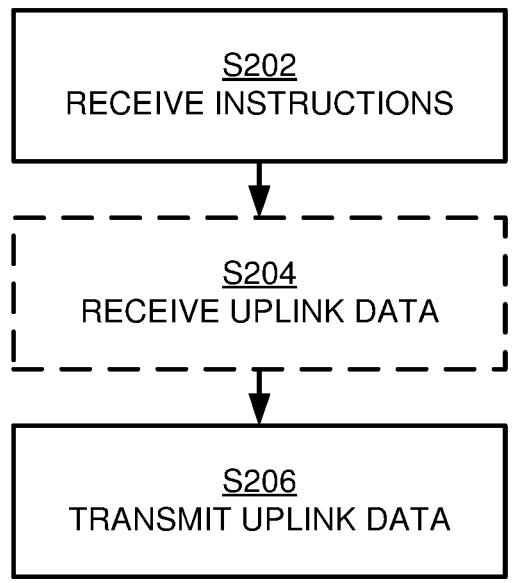
Fig. 3
Fig. 5

CONFIGURATION OF RESOLUTION OF UPLINK DATA

CROSS-REFERENCE TO RELATED APPLICATIONS

This application is a continuation of U.S. application Ser. No. 15/523,784, filed May 2, 2017, now U.S. Pat. No. 10,420,122 on Sep. 17, 2019, which application is national stage application, filed under 35 U.S.C. 371, of International Application No. PCT/SE2017/050218, filed Mar. 8, 2017, and claims priority to International Application No. PCT/SE2016/051035 filed Oct. 25, 2016, all the disclosures of which are fully incorporated herein by reference.

TECHNICAL FIELD

Embodiments presented herein relate to a method, a radio equipment controller, a computer program, and a computer program product for configuring resolution of uplink data. Embodiments presented herein further relate to a method, a radio equipment, a computer program, and a computer program product for selective resolution transmission of uplink data.

BACKGROUND

In communications systems, there may be a challenge to obtain good performance and capacity for a given communications protocol, its parameters and the physical environment in which the communications system is deployed.

For example, the introduction of digital beamforming antenna systems in access nodes, such as radio base stations, etc., could allow multiple simultaneous narrow beams to be used to provide network access to, and thus serve, multiple simultaneous terminal devices, such as user equipment (UE), etc. However, the current split in the access nodes between a radio equipment controller (REC) and a radio equipment (RE) as interconnected by the Common Public Radio Interface (CPRI) may no longer be feasible as passing the data for each individual radio chain over the CPRI interface could drive prohibitively high data rates.

In more detail, the bit rate of the current CPRI interface scales directly to the number of independent radio chains in the RE. When having e.g., a 200 MHz carrier bandwidth and 128 physical antenna elements in the beamforming antenna system, a bit rate of 530 Gbps would be needed for the CPRI interface with currently used sample rate and sample bit width. A further potential drawback with CPRI is the extra latency from uplink (UL; from terminal device to access node) sampling to the time the data can be used in downlink (DL; from access node to terminal device), as any information based on sampled data needs to be looped back from REC if to be used in RE.

One way to address the above-mentioned issues is to collapse the CPRI based architecture by removing the CPRI interface and putting the functionality of the REC in the RE. This approach has at least two drawbacks. Firstly, due to faster technological development of the REC compared to the RE, the technical lifetime of the REC is assumed to be shorter than that of the RE. Replacing the RE is more costly than replacing the REC. From this aspect it could thus be beneficial to keep the functionality of the RE as simple as possible. Secondly, the REC could be configured to make decisions spanning over multiple REs in order to make coordinated multi-sector decisions, e.g. when some REs represent coverage regions of the access node within the coverage regions of other REs (e.g. a so-called micro cell within a so-called macro cell). A collapsed architecture loses this overarching coordination possibility.

Hence, there is a need for an improved communication between the REC and the RE.

SUMMARY

An object of embodiments herein is to enable efficient communication between the REC and the RE.

According to a first aspect there is presented a method for configuring resolution of uplink data. The method is performed by an REC of an access node. The REC has an REC-RE interface to an RE of the access node. The method comprises providing instructions to the RE regarding with which resolution in time and/or frequency domain the uplink data is to be transmitted to the REC on the REC-RE interface. The uplink data is received by the RE on a radio interface and is to be transmitted from the RE to the REC. The REC thereby configures the resolution of the uplink data.

According to a second aspect there is presented an REC of an access node for configuring resolution of uplink data. The REC has an REC-RE interface to an RE of the access node. The REC comprises processing circuitry. The processing circuitry is configured to cause the REC to provide instructions to the RE regarding with which resolution in time and/or frequency domain the uplink data is to be transmitted to the REC on the REC-RE interface. The uplink data is received by the RE on a radio interface and is to be transmitted from the RE to the REC. The REC is thereby configured to configure the resolution of the uplink data.

According to a third aspect there is presented an REC of an access node for configuring resolution of uplink data. The REC has an REC-RE interface to an RE of the access node. The REC comprises processing circuitry and a storage medium. The storage medium stores instructions that, when executed by the processing circuitry, cause the REC to provide instructions to the RE regarding with which resolution in time and/or frequency domain the uplink data is to be transmitted to the REC on the REC-RE interface. The uplink data is received by the RE on a radio interface and is to be transmitted from the RE to the REC. The REC is thereby configured to configure the resolution of the uplink data.

According to a fourth aspect there is presented an REC of an access node for configuring resolution of uplink data. The REC has an REC-RE interface to an RE of the access node. The REC comprises a provide module configured to provide instructions to the RE regarding with which resolution in time and/or frequency domain the uplink data is to be transmitted to the REC on the REC-RE interface. The uplink data is received by the RE on a radio interface and is to be transmitted from the RE to the REC. The REC is thereby configured to configure the resolution of the uplink data.

According to a fifth aspect there is presented a computer program for configuring resolution of uplink data. The computer program comprises computer program code which, when run on processing circuitry of a of an REC of an access node having an REC-RE interface to an RE of the access node, causes the REC to perform a method according to the first aspect.

According to a sixth aspect there is presented a method for selective resolution transmission of uplink data. The method is performed by an RE of an access node. The RE has an REC-RE interface to an REC of the access node. The method comprises receiving instructions from the REC regarding with which resolution in time and/or frequency domain the uplink data is to be transmitted to the REC on the REC-RE interface. The uplink data is received by the RE on a radio interface and is to be transmitted from the RE to the REC. The method comprises transmitting the uplink data on the REC-RE interface according to the instructions, resulting in selective resolution transmission of the uplink data.

According to a seventh aspect there is presented an RE of an access node for selective resolution transmission of uplink data. The RE has an REC-RE interface to an REC of the access node. The RE comprises processing circuitry. The processing circuitry is configured to cause the RE to receive instructions from the REC regarding with which resolution in time and/or frequency domain the uplink data is to be transmitted to the REC on the REC-RE interface. The uplink data is received by the RE on a radio interface and is to be transmitted from the RE to the REC. The processing circuitry is configured to cause the RE to transmit the uplink data on the REC-RE interface according to the instructions, resulting in selective resolution transmission of the uplink data.

According to an eighth aspect there is presented an RE of an access node for selective resolution transmission of uplink data. The RE has an REC-RE interface to an REC of the access node. The RE comprises processing circuitry and a storage medium. The storage medium stores instructions that, when executed by the processing circuitry, cause the RE to perform operations, or steps. The operations, or steps, cause the RE to receive instructions from the REC regarding with which resolution in time and/or frequency domain the uplink data is to be transmitted to the REC on the REC-RE interface. The uplink data is received by the RE on a radio interface and is to be transmitted from the RE to the REC. The operations, or steps, cause the RE to transmit the uplink data on the REC-RE interface according to the instructions, resulting in selective resolution transmission of the uplink data.

According to a ninth aspect there is presented an RE of an access node for selective resolution transmission of uplink data. The RE has an REC-RE interface to an REC of the access node. The RE comprises a receive module (310a) configured to receive instructions from the REC regarding with which resolution in time and/or frequency domain the uplink data is to be transmitted to the REC on the REC-RE interface. The uplink data is received by the RE on a radio interface and is to be transmitted from the RE to the REC. The RE comprises a transmit module configured to transmit the uplink data on the REC-RE interface according to the instructions, resulting in selective resolution transmission of the uplink data.

According to a tenth aspect there is presented a computer program for selective resolution transmission of uplink data, the computer program comprising computer program code which, when run on processing circuitry of an RE of an access node having an REC-RE interface to an REC of the access node, causes the RE to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these RECs, these REs, and these computer programs allows for efficient communication between the REC and the RE.

Advantageously these methods, these RECs, these REs, and these computer programs enable the REC to configure the RE as needed, resulting in a flexible configuration of the RE. The RE does therefore not need to be pre-configured to use a certain resolution in time and/or frequency for the uplink data but will adapt the resolution according to the instructions provided by the REC.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 2, 3, 4, and 5 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
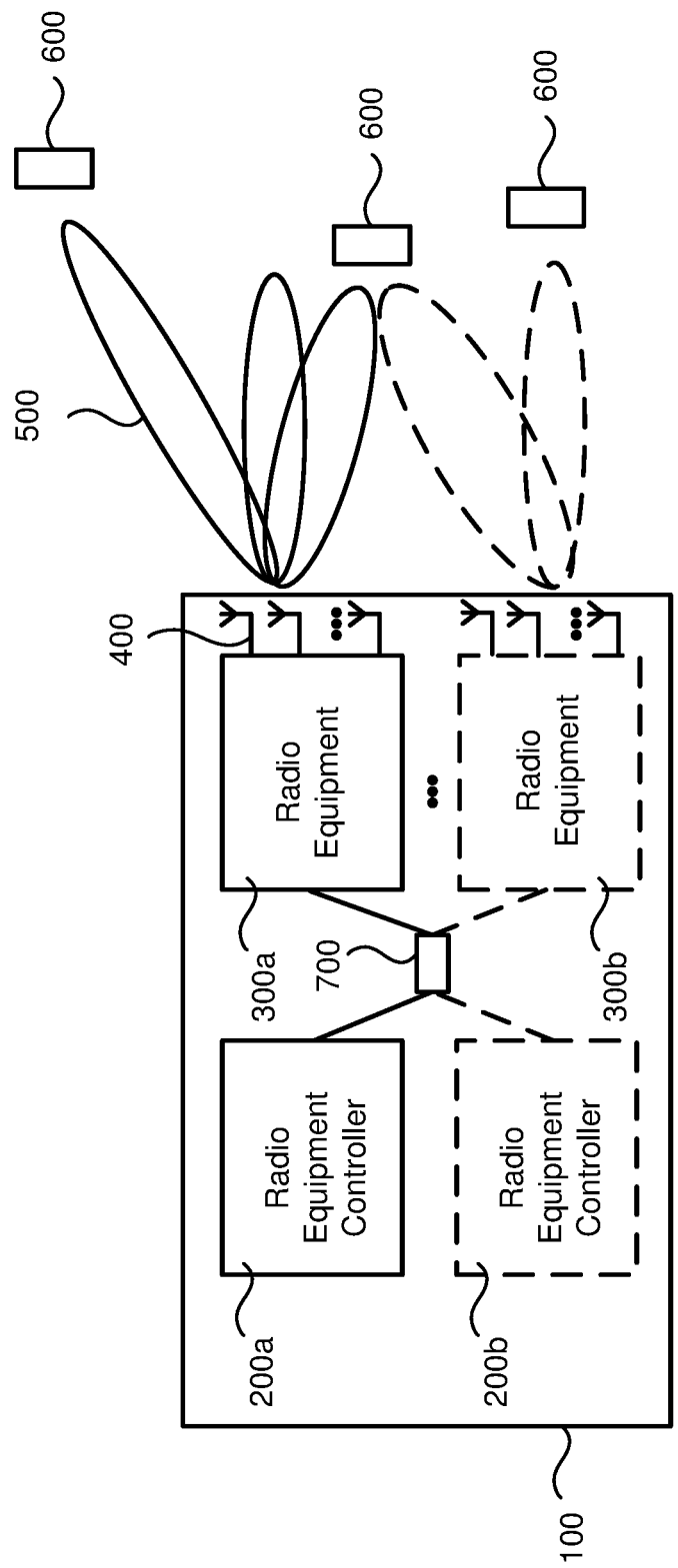
FIG. 1 is a schematic diagram illustrating an access node according to embodiments.

FIG. 1 is a schematic diagram illustrating an access node 100 where embodiments presented herein can be applied. The access node could be a radio base station such as a radio access network node, base transceiver station, node B, evolved node B, or access point. As disclosed above, the access node comprises at least one Radio Equipment Controller (REC) 200a, 200b and at least one Radio Equipment (RE) 300a, 300b. In the illustrative example of FIG. 1 the access node comprises two RECs and two REs, where each REC has an interface 700 to the REs; the interface 700 will hereinafter be denoted an REC-RE interface 700. Preferably, the REC-RE interface 700 is a wired interface, e.g. using optical fiber communications. However, alternatively the REC-RE interface 700 is a wireless interface, e.g. using radio communications. Further properties of the REC-RE interface 700 between the REC and the RE will be disclosed below. The REs are configured to perform DL transmissions to, and UL receptions from, terminal devices 600 in beams 500 by using appropriate beamforming weights at the antennas of the radio interface 400 at the RE. The beamforming weights define at least the pointing direction and the width of the beams.

The REC-RE interface 700 between REC 200a, 200b and RE 300a, 300b could be a packet-based interface, and hence not a streaming interface. This allows for quick and flexible allocation of resources on the REC-RE interface 700 to different terminal devices 600. The REC is configured to maintain knowledge about the terminal devices, and schedules the air interface between the access node and the terminal devices. The RE is configured to act on commands received from the REC.

As an illustrative example, consider a communications system having an air interface with a system bandwidth of 400 MHz and that provides support for 4 multiple input multiple output (MIMO) streams and utilizes access nodes with 64 antennas for beamforming. Using CPRI interfaces between the REC and the RE exposing all 64 antennas for the REC would require approximately 54 CPRI interfaces of 10 Gbps, since a CPRI interface carries about 480 MHz. Further, an interface using virtual antenna ports would require 4 MIMO streams of 400 MHz, and would require about 4 CPRI interfaces of 10 Gbps, since one 10 Gbps CPRI interface still carries data for about 480 MHz. By also moving the modulation DL to the RE, the 4 MIMO streams of 400 MHz would require 7 Gbps (assuming 256QAM and 20 LTE 20 MHz carriers), or one 10 Gbps CPRI interface. A higher bitrate of the CPRI interface is required in the UL if the whole system bandwidth is used, as demodulation is still performed in the REC.

A general aspect of the inventive concepts disclosed herein is to maximize the utilization of the REC-RE interface 700 between the REC 200a, 200b and the RE 300a, 300b, both in the case where there is only one REC 200a and when there are multiple RECs 200a, 200b sharing the REC-RE interface 700 (or segments of the REC-RE interface 700).

The embodiments disclosed herein thus relate to mechanisms for configuring resolution of uplink data and selective resolution transmission of uplink data. Unless otherwise stated the uplink data refers to data transferred from the RE 300a to the REC 200 on the REC-RE interface 700. Such uplink data could represent raw data as received on the radio interface 400 at the RE 300a and forwarded by the RE 300a to the REC 200a. Alternatively, such uplink data could represent refined data as determined by the RE 300a, where the refined data is based on raw data as received on the radio interface 400, and where the RE 300a processes the raw data in order to determine the refined data. That is, the refined data is determined from the raw data. One non-limiting example of raw data is in-phase and quadrature (IQ) constellation points. One example of refined data is channel estimate values.

In order to obtain such mechanisms there is provided an REC 200a, a method performed by the REC 200a, a computer program product comprising code, for example in the form of a computer program, that when run on processing circuitry of the REC 200a, causes the REC 200a to perform the method. In order to obtain such mechanisms there is further provided an RE 300a, 300b, a method performed by the RE 300a, 300b, and a computer program product comprising code, for example in the form of a computer program, that when run on processing circuitry of the RE 300a, 300b, causes the RE 300a, 300b to perform the method.

FIGS. 2 and 3 are flowcharts illustrating embodiments of methods for configuring resolution of uplink data as performed by the REC 200a. FIGS. 4 and 5 are flowcharts illustrating embodiments of methods for selective resolution transmission of uplink data as performed by the RE 300a, 300b. The methods are advantageously provided as computer programs 1420a, 1420b.

Reference is now made to FIG. 2 illustrating a method for configuring resolution of uplink data as performed by the REC 200a according to an embodiment. The REC 200a has an REC-RE interface 700 to an RE 300a, 300b of the access node 100.

The REC 200a configures the RE 300a, 300b in terms of which resolution to be used for transmission of uplink data. Particularly, the REC 200a is configured to perform step S106:

S106: The REC 200a provides instructions to the RE 300a, 300b regarding with which resolution in time and/or frequency domain the uplink data is to be transmitted to the REC 200a on the REC-RE interface 700. The uplink data is received by the RE 300a, 300b on the radio interface 400 and is to be transmitted from the RE 300a, 300b to the REC 200a on the REC-RE interface 700. The REC 200a thereby configures the resolution of the uplink data.

This enables the REC 200 to configure the RE 300a, 300b as needed, resulting in a flexible configuration of the RE 300a, 300b. The RE 300a, 300b does therefore not need to be pre-configured to use a certain resolution in time and/or frequency for the uplink data but will adapt the resolution according to the instructions provided by the REC 200a.

Embodiments relating to further details of configuring resolution of uplink data as performed by the REC 200a will now be disclosed.

Reference is now made to FIG. 3 illustrating methods for configuring resolution of uplink data as performed by the REC 200a according to further embodiments. It is assumed that step S106 is performed as described above with reference to FIG. 2 and a thus repeated description thereof is therefore omitted.

In some aspects the REC 200a determines the resolution (i.e., with which resolution the uplink data is to be transmitted to the REC200a) before providing instructions to the RE 300a, 300b. Hence, according to an embodiment the REC 200a is configured to perform step S102:

S102: The REC 200a determines which resolution the RE 300a, 300b is to use during transmission of the uplink data on the REC-RE interface 700.

The determination could be based on factors as will be given below.

In scenarios where a single REC 200a is operatively connected to one or more REs 300a, 300b the REC 200a may directly configure this one or more REs 300a, 300b by providing instructions as in step S106. However, there might be scenarios where two or more RECs 200a, 200b share one or more REs 300a, 300b.

That is, different RECs 200a, 200b might share the same RE 300a and/or the REC-RE interface 700. An option would be to have a fixed allocation of the REC-RE interface 700 for each of the RECs 200a, 200b to act within. Another approach is to have the RECs 200a, 200b negotiate for each subframe, or similar, on the best usage of the shared resources (as defined by one or more REs 300a, 300b and/or the REC-RE interface 700). The RECs 200a, 200b might therefore coordinate and adjust the traffic through the one or more RE 300a, 300b to fit into the available traffic capacity over the common REC-RE interface 700. In more detail, to handle scenarios with several RECs 200a, 200b, there might be a coordinating function within the RECs 200a, 200b communicating with its neighboring RECs 200a, 200b, negotiating the use of the available capacity of the REC-RE interface 700. In some aspects the REC 200a thus negotiates with at least one other REC 200b in conjunction with determining with which resolution the uplink data is to be transmitted on the REC-RE interface 700. The negotiation could comprise exchanging information with this at least one other REC 200b. Hence, according to an embodiment the REC 200a is operatively connected to a further REC 200b that shares the REC-RE interface 700 to the RE 300a, 300b with the REC 200a. The REC 200a could then be configured to perform step S104:

S104: The REC 200a negotiates, with the further REC 200b, the amount of resources for each of the RECs 200a, 200b to use on the REC-RE interface 700. The REC 200a could further negotiate with the further REC 200b which resolution to use for the uplink data to be transmitted from the RE 300a, 300b to the REC 200a. The REC 200a could further negotiate with the further REC 200b which resolution to use for the uplink data to be transmitted from the RE 300a, 300b to the further REC 200b.

Reference is now made to FIG. 4 illustrating a method for selective resolution transmission of uplink data as performed by the RE 300a according to an embodiment. The RE 300a has an REC-RE interface 700 to the REC 200a of the access node 100.

As disclosed above, the REC 200a in step S106 provides instructions to the RE 300a regarding with which resolution in time and/or frequency domain the uplink data is to be transmitted to the REC 200a. It is assumed that these instructions are received by the RE 300a. Hence, the RE 300a is configured to perform step S202:

S202: The RE 300a receives instructions from the REC 200a regarding with which resolution in time and/or frequency domain the uplink data is to be transmitted to the REC 200a on the REC-RE interface 700. The uplink data is received by the RE 300a, 300b on the radio interface 400 and is to be transmitted from the RE 300a, 300b to the REC 200a on the REC-RE interface 700.

The RE 300a then acts accordingly and is hence configured to perform step S206:

S206: The RE 300a transmits the uplink data on the REC-RE interface 700 according to the instructions. This results in selective resolution transmission of the uplink data.

Embodiments relating to further details of selective resolution transmission of uplink data as performed by the RE 300a, 300b will now be disclosed.

Reference is now made to FIG. 5 illustrating methods for selective resolution transmission of uplink data as performed by the RE 300a, 300b according to further embodiments. It is assumed that steps S202, S206 are performed as described above with reference to FIG. 4 and a thus repeated description thereof is therefore omitted.

In general terms, in order for the RE 300a to transmit the uplink data on the REC-RE interface 700 the RE 300a first needs to receive the uplink data on the radio interface 400. Hence, according to an embodiment the RE 300a is configured to perform step S204:

S204: the RE 300a receives the uplink data on the radio interface 400 (before transmitting it in step S206).

Further aspects and embodiments applicable to both the methods performed by the REC 200a and the RE 300a disclosed above will now be provided.

In some aspects the uplink data is uplink appointed reference symbols for sounding. In general terms, the UL sounding procedure is associated with the reception of what in LTE is called Sounding Reference Signal (SRS) and/or Demodulation reference signal (DMRS) from the beam forming perspective.

In some aspects the RE 300a is configured to identify the best beam directions within a consecutive number of subcarriers. Hence, according to an embodiment the uplink data is a beam direction report, and wherein the resolution pertains to the resolution of the beam direction report in the frequency domain. The RE 300a could thus be configured by the REC 200a to send over the selected beam directions per OFDM symbol from one sounding session to the REC 200a. Hence, according to an embodiment the beam direction report comprises an identification of a set of consecutive subcarriers. The set of consecutive subcarriers is called a reference signal (RS) section.

Figure 6:
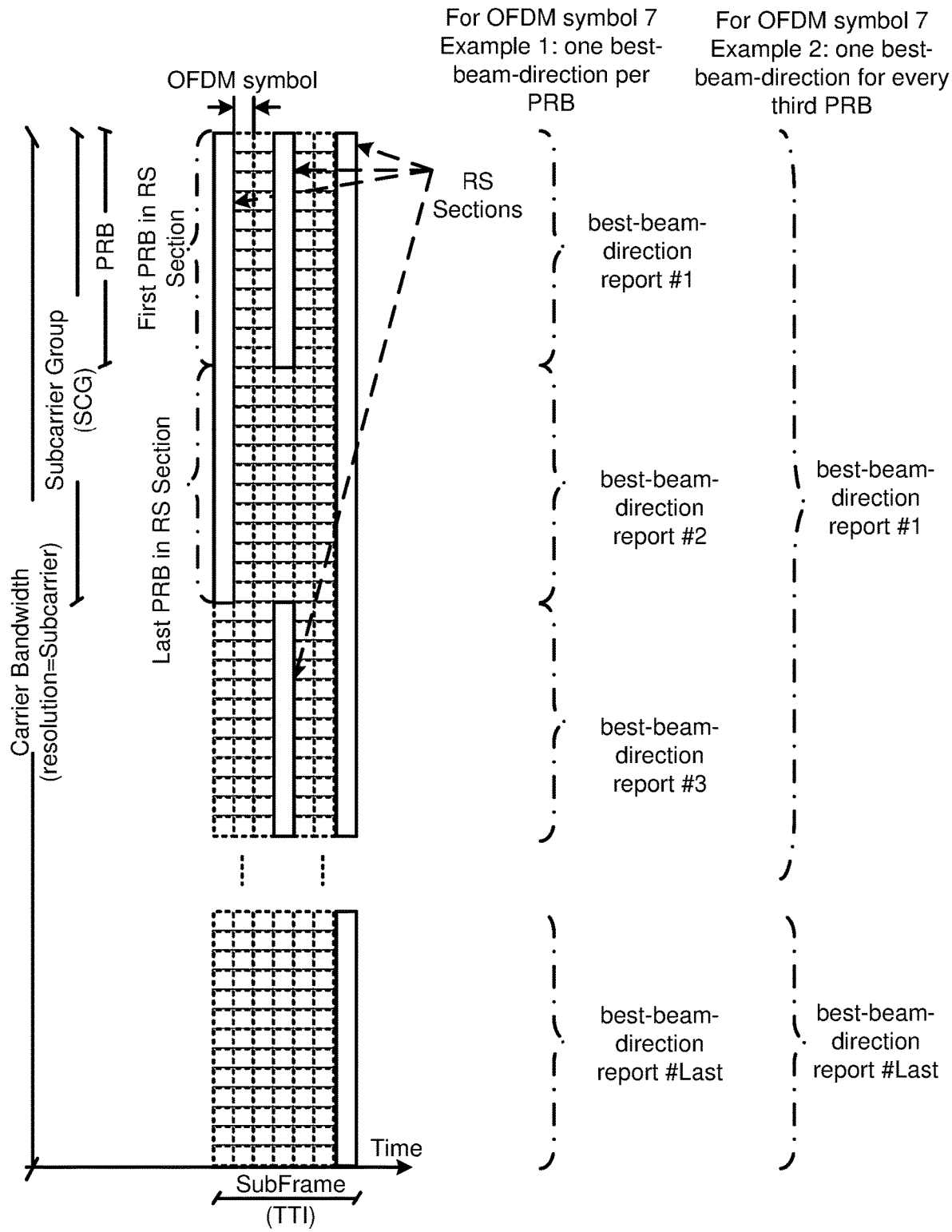
FIG. 6 is a schematic illustration of possible reference sections in a transmission time interval and the frequency resolution of the reported best beam direction according to embodiments.

FIG. 6 schematically illustrates possible RS sections in a transmission time interval (TTI) and the frequency resolution of the reported best beam direction. According to "Example 1" in FIG. 6 there is one best-beam-direction report per physical resource block (PRB), and according to "Example 2" in FIG. 6 there is one best-beam-direction report per every third PRB. In general terms, it is possible to have everything from one to multiple best-beam-directions reported from one RS section. Hence, according to an embodiment the set of consecutive subcarriers comprises between one single PRB and all available PRBs. Thus, there could be everything from one best-beam-direction report valid for the whole bandwidth, resulting in low resolution, to a best-beam-direction reported for every PRB or sub-carrier group (SCG), resulting in high resolution. According to an embodiment where the RE 300a, 300b receives OFDM symbols on the radio interface 400, the resolution pertains to how many beam direction reports in frequency domain are transmitted from the RE 300a, 300b to the REC 200a for each received OFDM symbol.

In general terms, the minimum number of consecutive subcarriers in an RS section corresponds to the number of sub-carriers within a PRB. The start and stop sub-carrier of an RS section as well as the OFDM symbol within the TTI define the location of the RS section. Several RS sections can be allocated in the same OFDM symbol (typically up to 128). Furthermore, multiple OFDM symbols within a TTI can have RS sections allocated.

In the RE 200a and/or RE 300a further processing is performed in order to obtain channel estimates in the selected beam directions per terminal device 600 and to e.g. calculate a covariance matrix. As will be further disclosed below with reference to FIG. 7, the channel estimates and the covariance matrix is then stored in a channel state memory that is connected to a beamforming control function. Information stored in the channel state memory is then by the beamforming control function used for beamforming weight calculation and pairing of multi-user MIMO (MU-MIMO) users.

Figure 7:
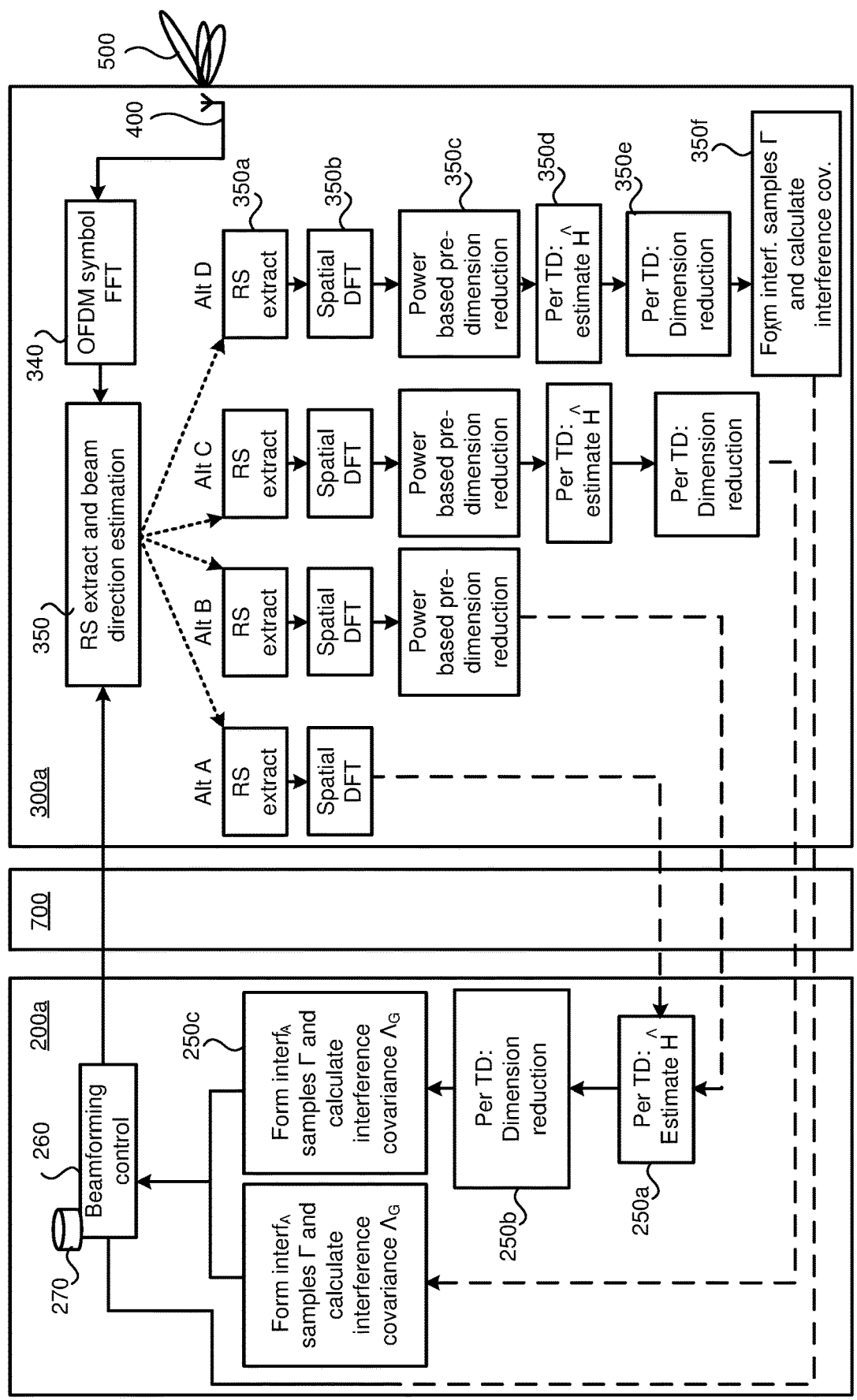
FIG. 7 is a schematic illustration of an access node according to embodiments.

FIG. 7 illustrates details of the REC 200a and the RE 300a together with the REC-RE interface 700 of an access node 100 according to embodiments. Four alternative deployments (hereinafter denoted "Alt. A", "Alt. B", "Alt. C", and "Alt. D") of the UL processing is outlined in FIG. 7. Each of these alternatives will now be described in order. The alternative deployments are provided in order admit flexible processor load balancing between the REC 200a and the RE 300a as well as handle terminal devices (denoted "TD" in FIG. 7) 600 with various latency demands.

Channel estimates and interference covariance matrix is stored in a channel state memory 270. The channel estimate and the interference covariance matrix can be used by the REC 200a for beamforming weight calculation and during the pairing of MU-MIMO users as performed by a beamforming control function 260 in the REC 200a, and/or beamforming weight calculation of single-user MIMO (SU-MIMO) users as performed by the RE 300a. It is also possible to perform the beamforming weight calculation of SU-MIMO users in the REC 200a as well as long as the channel estimates and the interference covariance matrix is stored in the RE 300a as well.

An OFDM symbol FFT function 340 is configured to apply an FFT to the samples received from the radio interface 400. An RS extract and beam direction estimation function 350 is configured to extract reference symbols and perform a beam direction estimate of the samples received from the OFDM symbol FFT function 340. Generally, the operations of the RS extract and beam direction estimation function 350 are divided into functions 350a-350f and 250a-250c depending on which of the four alternatives Alt. A to Alt. D that is used. An RS extract function 350a is configured to extract the reference signals. A spatial DFT function 350b is configured to apply a spatial discrete Fourier transform (DFT) to the extracted reference signals. A pre-dimension reduction function 350c is configured to reduce dimensionality of the output from the spatial DFT function 350b. A channel estimate function 350d, 250a is configured to estimate channel coefficients. A dimension reduction function 350e, 250b is configured to reduce dimensionality of the estimated channel coefficients. An interference covariance calculation function 350f, 250c is configured to form interference samples and calculate an interference covariance matrix. A more detailed description of the operations performed by these functions will be provided next.

In alternatives Alt. A and Alt. B the RE 300a is configured to identify the best beam directions based on received power. One difference between Alt. A and Alt. B is that the RE 300a for Alt. B is configured to reduce the number of beam directions before the output from the spatial DFT of the reference signals is transmitted to the REC 200a. This keeps down the amount of data to transfer on the REC-RE interface 700. Hence, according to an embodiment the RE 300a is instructed by the REC 200a to send spatial DFT transformed uplink appointed reference symbols for sounding on the REC-RE interface 700 (as in Alt. A). Further, according to an embodiment the RE 300a is instructed by the REC 200a to reduce dimension of the spatial DFT transformed uplink sounding data before sending it on the REC-RE interface 700 (as in Alt. B).

The dimension reduction could be performed at least for those beams with strongest power in the output from the spatial DFT transform or due to the resolution in the frequency domain of the Spatial DFT transformed output.

The RE 300a for alternatives Alt. C and Alt. D is configured to identify the best beam directions per sounded terminal device 600 for all reference signal sections. Hence, according to an embodiment the RE 300a is instructed by the REC 200a to send channel estimate information of the appointed reference symbols for sounding on the REC-RE interface 700, and where the channel estimate information is sent at least for those beams 500 in which strongest power from respective terminal devices 600 is received by the RE 300a over the radio interface 400.

In Alt. C, for each OFDM symbol that include reference signals, the REC 200a admits transmission over the REC-RE interface 700 from the RE 300a of channel estimate information in the best beam directions per terminal device 600 and gives the RE 300a the opportunity to send the received samples in all beam directions for all subcarriers within the reference signal sections (see above description relating to FIG. 6). Hence, according to an embodiment the RE 300a is instructed by the REC 200a to send only the channel estimate information of the appointed reference symbols for sounding that corresponds to the set of consecutive subcarriers. Further, also the amount of received samples that shall be transferred over the REC-RE interface 700 can be adjusted. Hence, according to an embodiment the RE 300a is instructed by the REC 200a to reduce dimension in frequency domain of a set of consecutive subcarriers that comprises the channel estimate information before sending it on the REC-RE interface 700. The transmission of all received samples for all subcarriers from the RE 300a to the REC 200a is done in order for the REC 200a to be able to calculate the interference covariance.

In Alt. D, for each OFDM symbol that include reference signals, the REC 200a admits transmission over the REC-RE interface 700 from the RE 300a of channel estimate information in the best beam directions per terminal device 600 and gives the RE 300a the opportunity to send the related interference covariance matrix. Hence, according to an embodiment the RE 300a is instructed by the REC 200a to send interference covariance information relating to the appointed reference symbols for sounding on the REC-RE interface 700. Further, in an embodiment the RE 300a is instructed by the REC 200a regarding with which resolution the interference covariance information is to be transmitted to the REC 200a before sending the interference covariance information on the REC-RE interface 700. Here, the resolution pertains to the resolution of the covariance matrix in the frequency domain.

Generally, for both alternatives Alt. C and Alt. D, the beam direction value for each terminal device 600 constitute a corresponding channel estimate and is provided for the specified resolution in the frequency domain within the specified reference signal sections (see above description relating to FIG. 6).

The REC 200a could be configured to, for all alternatives (Alt. A to Alt. D), adjust the frequency resolution of how detailed the best-beam-direction report shall be. The denser in the frequency domain the report shall be, the more load on the REC-RE interface 700 and vice versa (see above description relating to FIG. 6).

Figure 8:
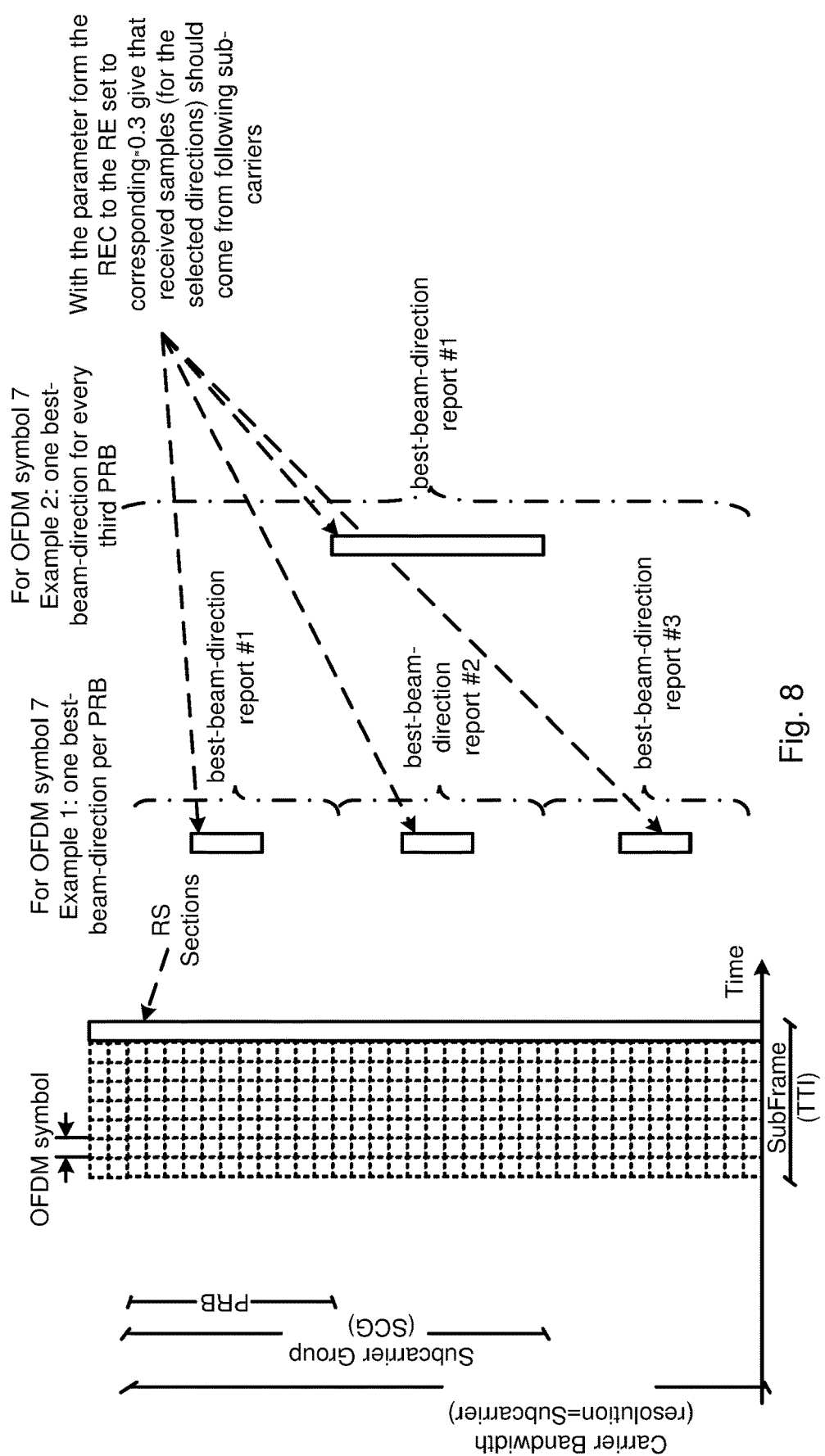
FIGS. 8 and 9 are schematic illustrations of frequency resolutions of the transmission over the REC-RE interface according to embodiments.

The REC 200a could be configured to for Alt. C adjust the amount of received samples that shall be transferred over the REC-RE interface 700. By providing a parameter to the RE 300a from the REC 200a about how many samples that shall be used for the estimation of the interference sample, it is possible to adapt the bitrate to the actual need. FIG. 8 schematically illustrates an example of different frequency resolutions of the transmission over the REC-RE interface 700 of received samples according to Alt. C.

Figure 9:
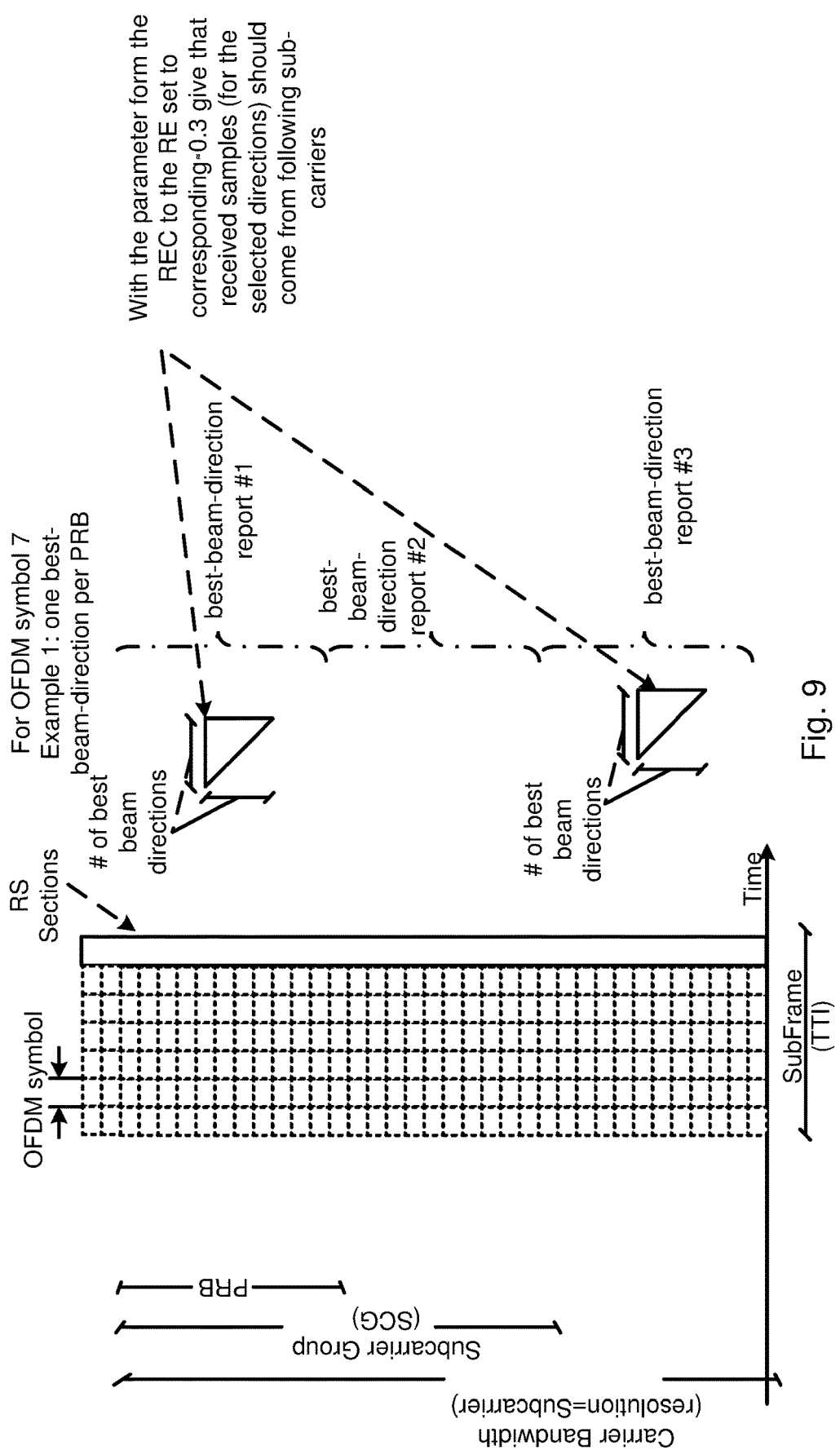

The REC 200a could be configured to for Alt. D adjust the frequency resolution of the interference covariance matrix. By providing a parameter to the RE 300a from the REC 200a about the density of interference covariance matrices, it is possible to adapt the bitrate of the transmission on the REC-RE interface 700 to the actual need. The frequency resolution of the interference covariance matrices could be different to the frequency resolution for the best beam direction reports. FIG. 9 schematically illustrates an example of different frequency resolutions of the transmission over the REC-RE interface 700 of the interference covariance matrix according to Alt. D.

Figure 10:
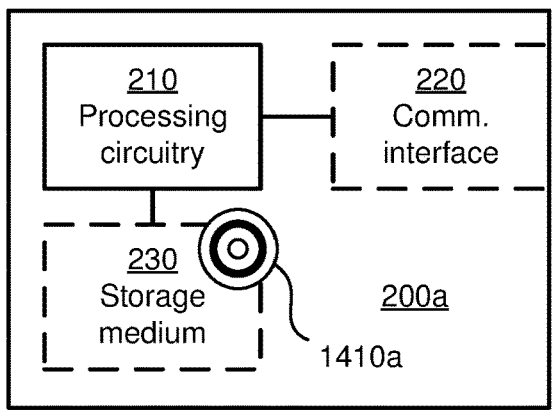
FIG. 10 is a schematic diagram showing functional units of a radio equipment controller according to an embodiment.

FIG. 10 schematically illustrates, in terms of a number of functional units, the components of an REC 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1410a (as in FIG. 14), e.g. in the form of a storage medium 230. The processing circuitry 210 may further be provided as at least one application specific integrated circuit (ASIC), or field programmable gate array (FPGA).

Particularly, the processing circuitry 210 is configured to cause the REC 200a to perform a set of operations, or steps, S102-S106, as disclosed above. For example, the storage medium 230 may store the set of operations, and the processing circuitry 210 may be configured to retrieve the set of operations from the storage medium 230 to cause the REC 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The REC 200a may further comprise a communications interface 220 for communications with other entities of the access node 100, such as another REC 200b and one or more REs 300a, 300b. As such the communications interface 220 may comprise one or more transmitters and receivers, comprising analogue and digital components. The communications interface 220 is operatively connected to the REC-RE interface 700.

The processing circuitry 210 controls the general operation of the REC 200a e.g. by sending data and control signals to the communications interface 220 and the storage medium 230, by receiving data and reports from the communications interface 220, and by retrieving data and instructions from the storage medium 230. Other components, as well as the related functionality, of the REC 200a are omitted in order not to obscure the concepts presented herein.

Figure 11:
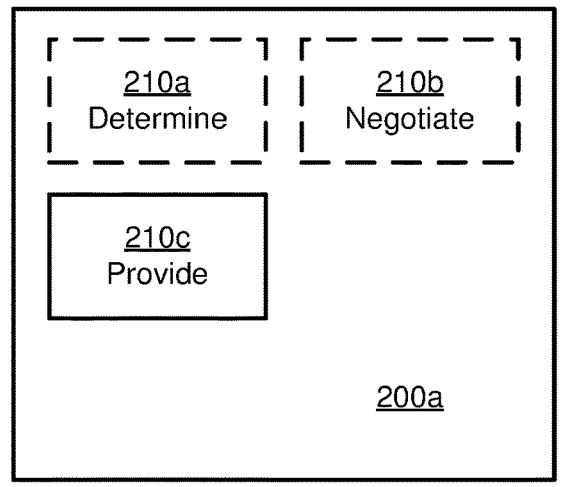
FIG. 11 is a schematic diagram showing functional modules of a radio equipment controller according to an embodiment.

FIG. 11 schematically illustrates, in terms of a number of functional modules, the components of an REC 200a according to an embodiment. The REC 200a of FIG. 11 comprises a provide module 210c configured to perform step S106. The REC 200a of FIG. 11 may further comprise a number of optional functional modules, such as any of a determine module 210a configured to perform step S102 and a negotiate module 210b configured to perform step S104. In general terms, each functional module 210a-210c may be implemented in hardware or in software. Preferably, one or more or all functional modules 210a-210c may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210c and to execute these instructions, thereby performing any steps of the REC 200a as disclosed herein.

Figure 12:
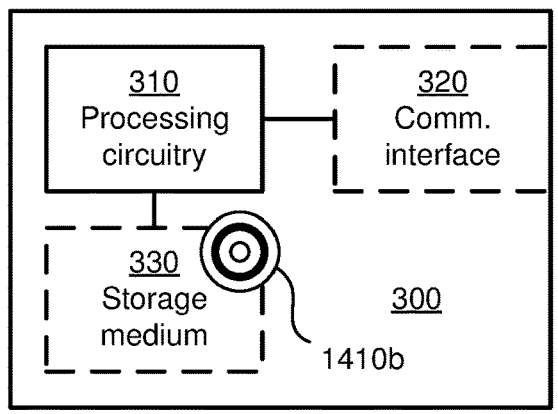
FIG. 12 is a schematic diagram showing functional units of a radio equipment according to an embodiment.

FIG. 12 schematically illustrates, in terms of a number of functional units, the components of an RE 300a, 300b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1410b (as in FIG. 14), e.g. in the form of a storage medium 330. The processing circuitry 310 may further be provided as at least one application specific integrated circuit (ASIC), or field programmable gate array (FPGA).

Particularly, the processing circuitry 310 is configured to cause the RE 300a, 300b to perform a set of operations, or steps, S202-S206, as disclosed above. For example, the storage medium 330 may store the set of operations, and the processing circuitry 310 may be configured to retrieve the set of operations from the storage medium 330 to cause the RE 300a, 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The RE 300a, 300b may further comprise a communications interface 320 for communications other entities of the access node 100, such as one or more RECs 200a, 200b. As such the communications interface 320 may comprise one or more transmitters and receivers, comprising analogue and digital components. The communications interface 320 is operatively connected to the REC-RE interface 700.

The processing circuitry 310 controls the general operation of the RE 300a, 300b e.g. by sending data and control signals to the communications interface 320 and the storage medium 330, by receiving data and reports from the communications interface 320, and by retrieving data and instructions from the storage medium 330. Other components, as well as the related functionality, of the RE 300a, 300b are omitted in order not to obscure the concepts presented herein.

Figure 13:
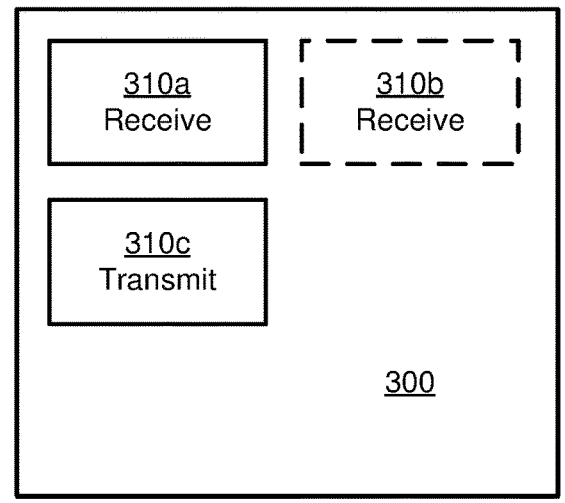
FIG. 13 is a schematic diagram showing functional modules of a radio equipment according to an embodiment.

FIG. 13 schematically illustrates, in terms of a number of functional modules, the components of an RE 300a, 300b according to an embodiment. The RE 300a, 300b of FIG. 13 comprises a number of functional modules; a receive module 310a configured to perform step S202 and a transmit module 310c configured to perform step S206. The RE 300a, 300b of FIG. 13 may further comprise a number of optional functional modules, such as a receive module 310b configured to perform step S204. In general terms, each functional module 310a-310c may be implemented in hardware or in software. Preferably, one or more or all functional modules 310a-310c may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310c and to execute these instructions, thereby performing any steps of the RE 300a, 300b as disclosed herein.

The RE and REC may be provided as standalone devices or as a part of at least one further device. For example, as disclosed above the RE and REC may be provided in an access node. Alternatively, functionality of the RE and the REC may be distributed between at least two devices, or nodes.

Thus, a first portion of the instructions performed by the RE or REC may be executed in a first device, and a second portion of the of the instructions performed by the RE or REC may be executed in a second device; the herein disclosed embodiments are not limited to any particular number of devices on which the instructions performed by the RE or REC may be executed. Hence, the methods according to the herein disclosed embodiments are suitable to be performed by an RE or REC residing in a cloud computational environment. Therefore, although a single processing circuitry 210, 310 is illustrated in FIGS. 10 and 12 the processing circuitry 210, 310 may be distributed among a plurality of devices, or nodes. The same applies to the functional modules 210a-210c, 310a-310c of FIGS. 11 and 13 and the computer programs 1420a, 1420b of FIG. 14 (see below).

Figure 14:
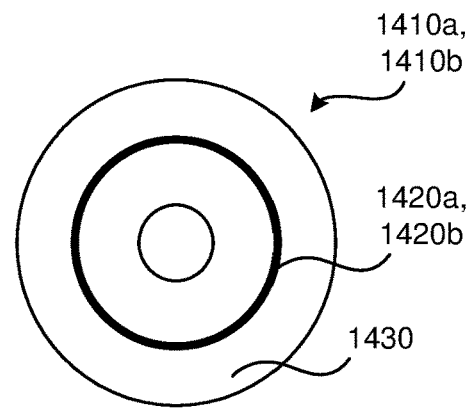
FIG. 14 shows one example of a computer program product comprising computer readable means according to an embodiment.

FIG. 14 shows one example of a computer program product 1410a, 1410b comprising computer readable means 1430. On this computer readable means 1430, a computer program 1420a can be stored, which computer program 1420a can cause the processing circuitry 210 and thereto operatively coupled entities and devices, such as the communications interface 220 and the storage medium 230, to execute methods according to embodiments described herein. The computer program 1420a and/or computer program product 1410a may thus provide means for performing any steps of the REC 200a as herein disclosed. On this computer readable means 1430, a computer program 1420b can be stored, which computer program 1420b can cause the processing circuitry 310 and thereto operatively coupled entities and devices, such as the communications interface 320 and the storage medium 330, to execute methods according to embodiments described herein. The computer program 1420b and/or computer program product 1410b may thus provide means for performing any steps of the RE 300a, 300b as herein disclosed.

In the example of FIG. 14, the computer program product 1410a, 1410b is illustrated as an optical disc, such as a CD (compact disc) or a DVD (digital versatile disc) or a Blu-Ray disc. The computer program product 1410a, 1410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420a, 1420b is here schematically shown as a track on the depicted optical disk, the computer program 1420a, 1420b can be stored in any way which is suitable for the computer program product 1410a, 1410b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

What is claimed is:

1. A radio equipment controller (REC) of an access node for configuring resolution of uplink data, the REC comprising:
   an REC-RE interface to a radio equipment (RE) of the access node; and
   processing circuitry, the processing circuitry being configured to cause the REC to:
      provide instructions to the RE regarding a resolution in time and/or frequency domain with which beam direction reports are to be transmitted to the REC on said REC-RE interface, wherein the beam direction reports are based on uplink appointed reference symbols for sounding received by the RE on a radio interface and is to be transmitted from the RE to the REC, thereby configuring the resolution of the beam direction reports that are received by the REC.

2. The REC of claim 1, wherein the resolution in time pertains to an OFDM symbol.

3. The REC of claim 1, the processing circuitry being configured to cause the REC to:
   provide instructions to an additional RE regarding a resolution in time and/or frequency domain with which beam direction reports are to be transmitted to the REC on said REC-RE interface, thereby configuring the resolution of the beam direction reports that are received by the REC from the additional RE.

4. The REC of claim 1, the processing circuitry being configured to cause the REC to:
   determine which resolution the RE is to use during transmission of uplink data on the REC-RE interface.

5. The REC of claim 1, wherein:
   the REC is operatively connected to an additional RE via the REC-RE interface; and
   the processing circuitry is further configured to cause the REC to negotiate, with the additional RE, an amount of resources for each of the RE and the additional REC to use on the REC-RE interface.

6. A radio equipment (RE) of an access node for selective resolution transmission of uplink data, the RE comprising:
   an REC-RE interface to a radio equipment controller (REC) of the access node and comprising processing circuitry, the processing circuitry being configured to cause the RE to:
   receive instructions from the REC regarding a resolution in time and/or frequency domain with which beam direction reports are to be transmitted to the REC on said REC-RE interface, wherein the beam direction reports are based on uplink appointed reference symbols for sounding received by the RE on a radio interface and is to be transmitted from the RE to the REC; and
   transmit said beam direction reports on said REC-RE interface according to said instructions.

7. The RE of claim 6, wherein the beam direction report comprises an identification of a set of consecutive subcarriers.

8. The RE of claim 7, wherein the set of consecutive subcarriers comprises between one single physical resource block and all available physical resource blocks.

9. The RE of claim 8, wherein the RE is instructed to send only the channel estimate information of the appointed reference symbols for sounding that corresponds to the set of consecutive subcarriers.

10. The RE of claim 6, wherein the RE receives OFDM symbols on the radio interface, and wherein the resolution pertains to how many beam direction reports in frequency domain are transmitted from the RE to the REC for each received OFDM symbol.

11. The RE of claim 6, wherein the RE is instructed to send spatial discrete Fourier transform (DFT) transformed uplink appointed reference symbols for sounding on said REC-RE interface.

12. The RE of claim 11, wherein the RE is instructed to reduce dimension of the spatial DFT transformed uplink sounding data before sending it on said REC-RE interface.

13. The RE of claim 6, wherein the RE is instructed to send channel estimate information of the appointed reference symbols for sounding on said REC-RE interface, the channel estimate information being sent at least for those beams in which strongest power from respective terminal devices is received by the RE over the radio interface.

14. The RE of claim 13, wherein the RE is instructed to reduce dimension in frequency domain of a set of consecutive subcarriers that comprises the channel estimate information before sending it on said REC-RE interface.

15. The RE of claim 13, wherein the RE is instructed to send interference covariance information relating to the appointed reference symbols for sounding on said REC-RE interface.

16. The RE of claim 15, wherein the RE is instructed with which resolution the interference covariance information is to be transmitted to the REC before sending it on said REC-RE interface, wherein the resolution pertains to resolution of a covariance matrix in frequency domain.

17. A non-transitory computer-readable storage medium having instructions stored thereon that, when executed by processing circuitry of a radio equipment (RE) of an access node, cause the processing circuitry to perform operations comprising:
   receiving instructions from a radio equipment controller (REC) regarding a resolution in time and/or frequency domain with which beam direction reports are to be transmitted to the REC on an REC-RE interface, wherein the beam direction reports are based on uplink appointed reference symbols for sounding received by the RE on a radio interface and are to be transmitted from the RE to the REC; and
   transmitting said beam direction reports on said REC-RE interface according to said instructions.

18. The computer-readable storage medium of claim 17, wherein at least one beam direction report comprises an identification of a set of consecutive subcarriers.

19. The computer-readable storage medium of claim 18, wherein the set of consecutive subcarriers comprises between one single physical resource block and all available physical resource blocks.

20. The computer-readable storage medium of claim 17, wherein the resolution pertains to how many beam direction reports in frequency domain are transmitted from the RE to the REC for each received OFDM symbol.

* * * * *